July 21, 1959 H. B. REED, JR., ET AL 2,896,095
ELECTROCHEMICAL ELEMENT FOR AUTOMATIC CONTROL
Filed June 27, 1957 2 Sheets-Sheet 1

INVENTORS.
HERBERT B. REED JR.
NELSON N. ESTES
BY
ATTYS.

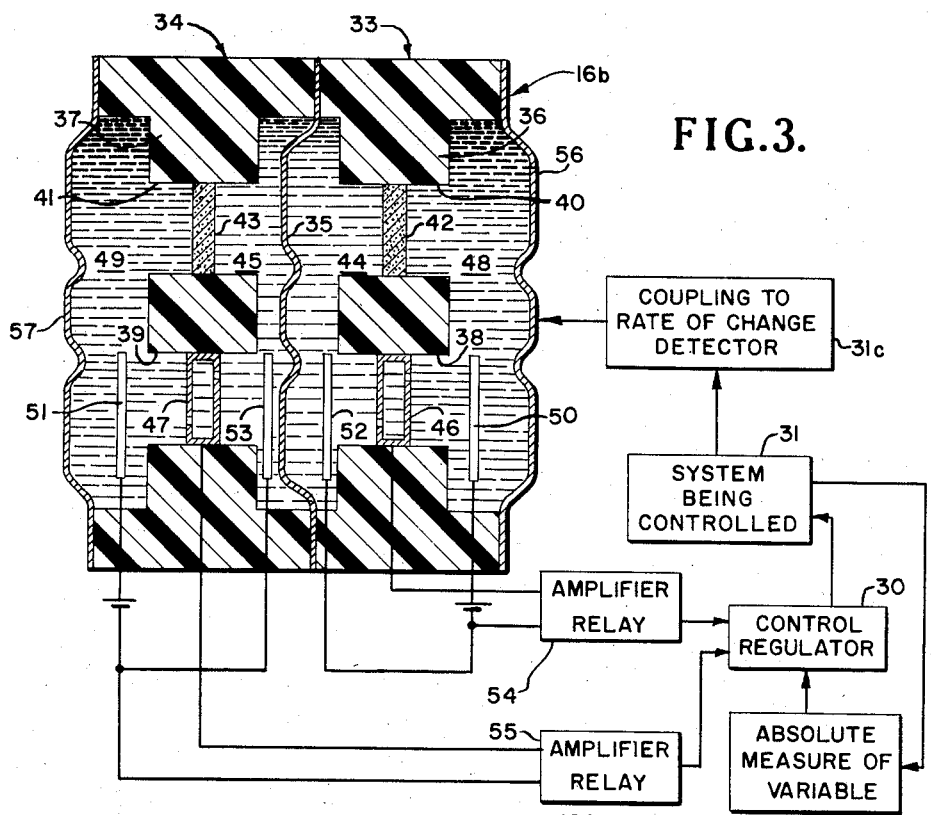
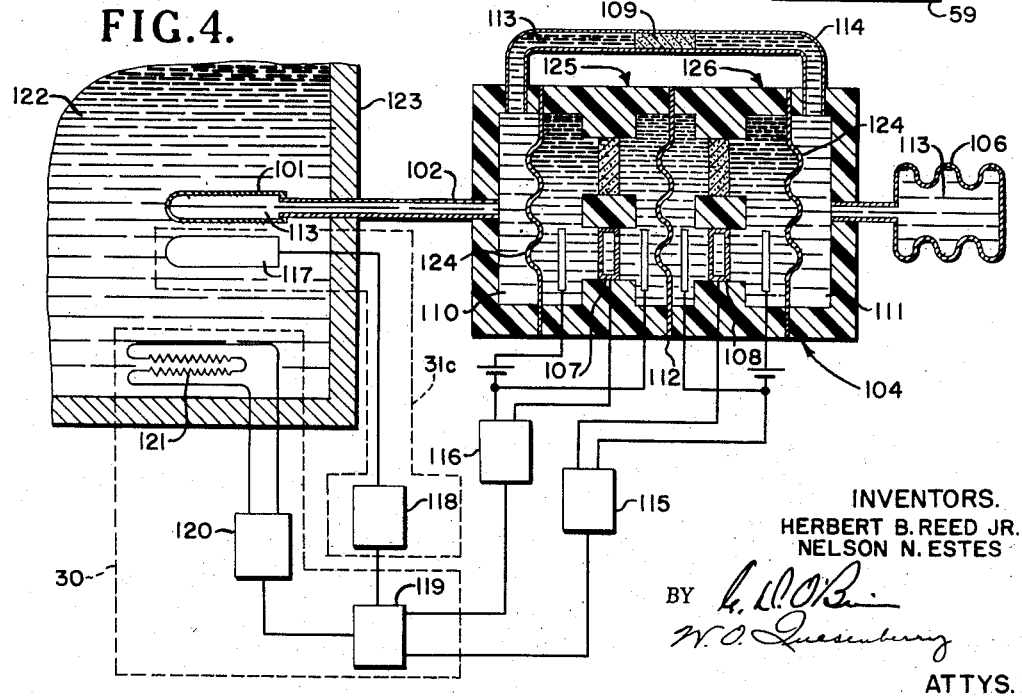

United States Patent Office 2,896,095
Patented July 21, 1959

2,896,095

ELECTROCHEMICAL ELEMENT FOR AUTOMATIC CONTROL

Herbert B. Reed, Jr., and Nelson N. Estes, Silver Spring, Md., assignors to the United States of America as represented by the Secretary of the Navy Application June 27, 1957, Serial No. 668,575

24 Claims. (Cl. 307—149)

(Granted under Title 35, U.S. Code (1952), sec. 266)

The invention described herein may be manufactured and used by or for the Government of the United States of America for governmental purposes without the payment of any royalties thereon or therefor.

This application relates to an automatic control system and is more particularly concerned with a system including a regenerative, electrochemical damping cell having a predetermined functional response to the rate of change of the variable being controlled.

It is one object of this invention to provide an automatic control system having a simple and rugged damping component to prevent violent fluctuations in the variable being controlled. It is another object of this invention to provide an electrochemical cell for use in an automatic control system which cell determines the rate and direction of change of the variable being controlled and produces an electrical output signal dependent upon the rate of change of the variable.

A further object of this invention is to provide an electrochemical device having a shaped electrode which produces an output voltage having a predetermined functional response to the rate of change of a selected variable to decrease hunting in an automatic control system. A still further object is to provide an automatic control system including an element having no electronic components, which system continuously produces a controlling voltage dependent upon the rate and direction of change of the variable being controlled.

Yet another object of this invention is to provide an electrochemical anti-hunting component for an automatic control system, having a response to the rate of variations in the system being controlled which response may be selectively altered by changing the shape of one of the electrodes of the electrochemical device.

These and many other objects will become more readily apparent when the following specification is read in conjunction with the attendant drawing in which:

Fig. 3 is another automatic control arrangement illustrating a longitudinal section of a modified detector cell of the present invention which cell is responsive to the rate and direction of changes in the controlled variable;

Fig. 4 is a schematic representation of the control system used in the regulation of a constant temperature bath;

Figure 1:
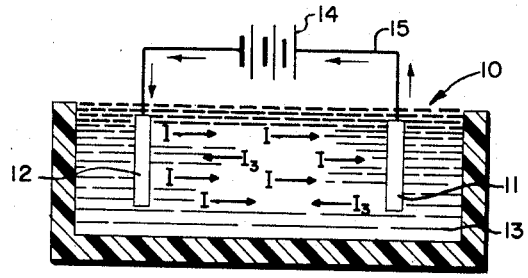
Fig. 1 is a longitudinal section of a simple electrochemical cell, representative of the general principles of the instant invention, which cell is presented to aid in understanding the operation of this invention.

Referring now in greater detail to Fig. 1, an electrochemical cell 10 comprises an anode 11 and a cathode 12 immersed in an oxidation-reduction or redox solution, or system 13. For purposes of illustration only, a typical electrochemical solution or system 13 composed of $I_3^-$ and $I^-$ ions will be described but it is understood that any system or solution containing similarly charged reducible and oxidizable ions would be acceptable for practicing this invention. The terms "oxidizable" and "reducible" as employed in this specification and the appended claims are used in a broad chemical sense, that is to say, a loss in electrons is "oxidation" and conversely a gain of electrons is "reduction." Therefore, the terms "reducible" and "oxidizable" used herein mean capable of capturing electrons and capable of donating electrons, respectively.

The oxidation-reduction system 13 may be made by dissolving potassium iodide in water, alcohol or any suitable ionizing solvent and then adding a small amount of free iodine. The potassium iodide dissociates to form $I^-$ ions, and the iodine which is present in a relatively small quantity combines with the iodide ions in accordance with the reaction: $I_2 + I^- \rightleftharpoons I_3^-$. Since the iodide ions are present in large excess, this reaction tends to be driven to the right so that at equilibrium, substantially all the iodine is present in the form of $I_3^-$ and the solution 13 contains $I^-$ ions and $I_3^-$ ions. Battery 14 is externally connected between the anode 11 and the cathode, or $I_3^-$ ion collector electrode 12 so that the $I^-$ ions which migrate toward the anode are oxidized according to the hereinbelow Equation II, and the $I_3^-$ ions which migrate toward the cathode are reduced, according to Equation I. This results in electron flow in wire 15 in the direction shown in Fig. 1.

(I)  $\qquad I_3^- + 2e \rightarrow 3I^-$ (II)  $\qquad 3I^- - 2e \rightarrow I_3^-$ where $e$ represents an electron.

It is apparent from these equations that as long as the potential applied by battery 14 does not exceed the hydrogen over-voltage or decomposition voltage of the solution so that the solvent is not decomposed, no gas is evolved at the cathode, and the concentration of the ions in solution remains constant. That is, for each $I_3^-$ ion converted to $3I^-$ ions at the cathode, $3I^-$ ions are converted to an $I_3^-$ ion at the anode.

The decomposition voltage for an aqueous iodine-iodide solution is about 1.1 volts. Therefore the output voltage of battery 14 is selected so as not to exceed this value. However, a battery exceeding this value may be employed if it is only of such magnitude that the internal voltage drop in the cell or external voltage drop in external resistors, due to the current from the $I_3^-$ ion available at the cathode, is sufficient to neutralize the excess voltage. If methyl alcohol solution is used, the decomposition voltage is even lower.

In the event that it is desired to increase the power output of cell 10, an oxidation-reduction system having a higher decomposition voltage may be substituted for the iodine-iodide system. For example, an aqueous bromine-bromide solution has a decomposition voltage of 1.6 volts and a current output approximately equal to that of the iodine cell. Therefore, a higher battery potential might be employed to give greater power output if a bromine cell is utilized.

After initial equilibrium is reached, the cathode tends to become strongly polarized because of the depletion of $I_3^-$ ions in the solution adjacent it. The polarization of the anode is negligible. This is readily understandable when it is considered that the $I^-$ ion is present in the system in large excess over stoichiometric quantities required for the opposite reactions occurring at the anode and the cathode. Therefore, $I^-$ ions are in abundant supply adjacent to the anode 11. On the other hand, the $I_3^-$ ions are in scant supply at the cathode 12 and the cathode is "starved" for $I_3^-$ ions. Because of the starved condition of the cathode, the rate of the reaction represented by hereinbefore Equations I and II is controlled primarily by the rate at which the $I_3^-$ ions migrate through the system to the cathode 12. In order to comprehend the function of this cell, it must be appreciated that at equilibrium the $I_3^-$ ion moves through the solution 13 as though it were electrically neutral and its motion toward the cathode is affected only slightly by the electric field adjacent to the cathode. This slow diffusion rate produces a small current flow through wire 15 of battery 14 and the electrochemical cell 10 when the system 13 is quiescent. However, if this solution is disturbed or agitated the current flow is increased many fold.

Apparently then, if the solution 13 is stirred or moved in the direction toward cathode 12 so that the slow diffusion of $I_3^-$ ions toward the cathode is supplemented by physical flow of the solution, the rate of the electrochemical reaction and consequently the electron flow in wire 15 is multiplied.

The current produced in wire 15 by movement of the system 13 toward the cathode is a function of the normality and velocity of the fluid flowing. Thus:

(III)    $$I \text{ out} = \frac{KNFV^a}{1000}$$

where:

$I$ out = current output in amperes
$N$ = normality of the detector solution in equivalents of $I_3^-$ per liter
$F$ = Faradays' constant $\left(96{,}500 \ \frac{\text{coulombs}}{\text{equivalent}}\right)$
$V$ = volumetric rate of flow of the solution cc./sec.
$K$ = efficiency parameter depending on the efficiency of the reducible ion capture at the cathode
$a$ = a positive number less than or equal to 1

It will be shown hereinbelow, that by altering the geometry of the cathode, the value of $a$ may be changed so that the output of the cell may be made to vary as a function of the square root or log of the fluid flow rate.

Attention is also directed to the fact that the output current for a given cell depends on the instantaneous rate at which the solution moves toward the cathode and not upon the total quantity of solution flowing over a relatively long period of time.

Figure 2:
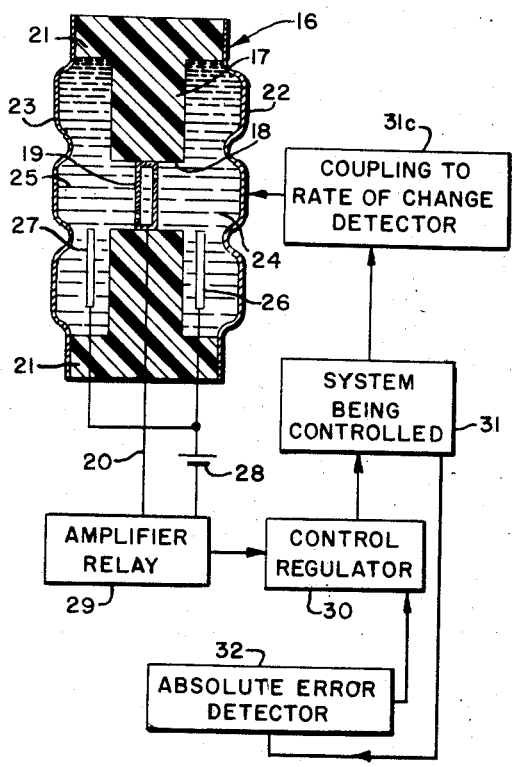
Fig. 2 is a block diagram of an automatic control system and showing in section an electrochemical component responsive to the rate of change of the controlled variable, which system embodies the principles of this invention.

In Fig. 2 is shown one preferred embodiment of the invention utilizing the above described phenomena in an electrochemical element which may advantageously be employed in an automatic control system. As shown in Fig. 2, the electrochemical cell 16 comprises an annular disc 17, composed of an electrically insulating material such as polymonochlorotrifluoroethylene and having a central aperture 18 and a peripheral flange 21 formed integral therewith. Disposed within aperture 18 is a shaped cathode or reducible ion collector electrode 19 which will be described more fully hereinafter. This cathode has an electric lead wire 20 extending through the disc 17. A pair of inert compliant diaphragms 22 and 23 are secured to the peripheral flange 21 at opposite sides of the disc to form a first interior compartment 24 and a second internal compartment 25. A pair of anodes 26 and 27 are disposed within compartments 24 and 25 respectively, each of the anodes being externally connected to the positive terminal of battery 28. The interior of the cell 16, which includes compartments 24 and 25 and aperture 18 is filled with a solution containing a system of oxidizable ions and reducible ions such as an iodide-triodide, or ferrocyanide-ferricyanide in a suitable solvent which may conveniently be water or, if the automatic controller is to be subjected to low ambient temperatures, it may be desirable to use alcohol. A typical cell contains an aqueous solution of two normal potassium iodide (2 N KI) and five hundredths normal iodine (0.05 N $I_2$). The exact concentration is not critical; however, it is desirable that the $I^-$ ion concentration is at least tenfold greater than the $I_3^-$ ion concentration so that the $I^-$ ion concentration contributes to the conductivity of the solution in bulk and the $I_3^-$ ion is the controlling ion in the electrochemical reaction for the reasons set forth above. Furthermore, the concentration of the $I_3^-$ ions must be maintained at a value not greatly in excess of .2 N so that $I_3^-$ ions will be in scant supply adjacent to the cathode. The negative terminal of battery 28 is connected to one input terminal of relay 29 and the lead 20 from cathode 19 completes the circuit through the relay and the cell 16. Although element 29 is herein termed a relay, it may also conveniently be an amplifier relay to amplify the output signal from the cell 16 and for that reason is shown as an "amplifier relay" in the drawings. Regardless of the specific structure of element 29, it serves to apply the output signal or a magnified output signal of the cell 16 to actuate an automatic regulator 30 which may take the form of a heating element, cooling coil, pressure relief valve, pump or any device which may be operated to correct an error detected in the system 31 which is being controlled. System 31 is coupled to the cell 16 via any suitable coupling means 31c such as, for example, a fluid, mechanical or thermal connection to one of the diaphragms 22 or 23, a suitable coupling means being more fully described hereinafter. Fig. 2 indicates that diaphragm 22 is operatively connected to the system being controlled so that as the rate of change of the controlled variable in system 31 changes, the diaphragm 22 will be flexed an amount proportional thereto. Cell 16 does not distinguish between movement of the diaphragm 22 to either the right or the left, therefore the cell cannot distinguish between positive errors and negative errors in the system 31 and will respond to the rate of flexure of the diaphragm regardless of the direction of flexure.

It should be apparent from the foregoing that the absolute error detector 32 measures the absolute error in the system 31 and is not responsive to the rate of change of this error, and detector cell 16 responds only to the rate of change of the error so that when the rate of change of the error is large it will apply a correction signal to the regulator 30 in addition to that applied by detector 32. As the rate of change of the absolute error becomes less, the correction applied by cell 16 decreases so that the only correction is that applied by the absolute error detector 32. Thus, compensation based upon the variation of the rate of change of the error is made by detector cell 16 in anticipation of the approach to the desired operating point of system 31.

Figure 3 shows an automatic control system, substantially similar to Fig. 2, including a modified detector 16b which is capable of distinguishing between positive and negative errors in the system being controlled 31. As seen in Fig. 3 the detector 16b is a double cell comprising two cells 33 and 34 separated by a fluid pressure transmitting diaphragm 35. Each of these cells has a disc 36 and 37 generally similar to the disc 17 of the detector shown in Fig. 2 except that the discs 36 and 37 each have two apertures; the apertures 38 and 39 contain the reducible ion collector electrodes 46 and 47 generally similar in function and design to the cathode 19 of cell 16 in Fig. 2. The other apertures 40 and 41 in these discs contain a microporous plug or filter 42 and 43 respectively. The portions of cells 33 and 34 adjacent diaphragm 35 are filled with a very dilute solution of the reactive $I_3^-$ ions as indicated generally at 44 and 45 while the other half of these cells is filled with a relatively concentrated solution of $I_3^-$ ions indicated at 48 and 49.

The microporous filters 42 and 43 maintain the concentration difference between halves of the cells 33 and 34 during operation of the detector. These filters provide an electrolytic flow path between each ion trap electrode and its respective anode to allow the I$^-$ ions formed at electrodes 46 and 47 to diffuse back to compartments 48 and 49 respectively. This flow through the filters 42 and 43 is sufficient to replenish the supply of I$^-$ ions in compartments 48 and 49 when the cell is quiescent and the current flowing is governed by the slow diffusion of I$_3^-$ ions toward the cathode. At the same time, the filters 42 and 43 present sufficient resistance to the flow of the larger and less mobile I$_3^-$ ions to prevent these ions from diffusing to the less concentrated solutions in compartments 44 and 45 from the more concentrated solutions in compartments 48 and 49 respectively. It is to be understood that the term "concentrated" when used in referring to the solutions at 48 and 49 is only a relative term and that these solutions must not be too rich in I$_3^-$ ions or the detector 16b will not operate properly since electrodes 46 and 47 must be "starved" for I$_3^-$ ions. Yet these solutions are a great deal more concentrated than solutions 44 and 45 in which the concentration of the reactive reducible I$_3^-$ ion is practically zero.

It should be noted that the I$_3^-$ ion collector electrodes 46 and 47 are negative with respect to electrodes 50 and 51 which are also positive with respect to electrodes 52 and 53. The output of cell 33 is fed to the signal increasing amplifier 54 and the output of cell 34 is impressed upon signal decreasing amplifier 55. These two amplifiers supply correction voltages to the control regulator 30 as the rate of change of the error in the system being controlled varies.

A signal output is derived from cell 33 only when the diaphragm 56 is moved toward the left in Fig. 3 because the relatively concentrated I$_3^-$ ion solution 48 is then moved toward the I$_3^-$ ion trap 46 giving rise to an output voltage. On the other hand, when the diaphragm 56 is moved to the right the solution 44 which contains few I$_3^-$ ions is swept toward the ion trap 46 while the concentrated solution 48 is swept away from this electrode. Therefore, there is no appreciable output from that cell in this condition. However, cell 34 produces a signal when the diaphragms 56 and 57 are moved to the right since the relatively concentrated I$_3^-$ in solution 49 is then brought close to the I$_3^-$ ion collector electrode 47. Thus by separating the concentration of the reducible ion in each cell, as shown, it is possible to determine whether the solution flow is from the right to the left or in the opposite direction and corresponding indications if the error in system 31 is increasing or decreasing. If the controlled variable in the system 31 is increasing, cell 33 will produce a current at some predetermined function of the rate of change of the variable being controlled which current will be amplified by amplifier 54 and impressed upon regulator 30 which will apply a correction to system 31. On the other hand, if the variable is decreasing, cell 33 will cease producing useable current and cell 34 will apply a corrective signal to the amplifier 55 which will, in turn, apply a signal to the controller 30. The output of the detector 16b may be additive or subtractive with respect to the corrective signal applied by the absolute measure of variable detector 59.

Figure 4 represents one particular automatic control system in which the detector 16 may be advantageously employed. This control system will be described herein so that the operation and advantages of this invention may become even more clearly understood.

As shown in Fig. 4, the system to be controlled is a temperature bath 122 within a tank or container 123. A resistance heater 121 is disposed within the tank 123 to maintain the bath at the desired temperature. The resistance thermometer 117 is connected to the input circuit of an amplifier 118 to thereby control the magnitude of the amplifier output in a manner corresponding to the temperature fluctuations in bath 122. If the actual temperature is equal to the desired temperature, a signal of predetermined magnitude will be applied to the motor control 119-variable transformer 120 combination which will regulate the current supplied to the heater 121 and consequently control the heat dissipated in resistance heater 121 to a value sufficient to compensate for the environmental heat losses in the bath 122 to maintain the bath in thermal equilibrium.

This portion of the system, which is old in the art, tends to introduce fluctuations in the temperature of the bath. Therefore the present invention contemplates the addition of the novel electrochemical detector cell of the invention to effectively damp the temperature variations by determining in a novel manner the rate of change of the temperature of bath 122. The detector 104 is substantially similar to cell 16b of Fig. 3 and is composed of a pair of electrochemical cells 125 and 126 operatively connected via the compliant membrane or diaphragm 112. The bath 122 is coupled to cell 104 by a hydraulic system consisting of thin walled bulb 101, connecting tube 102 and by-pass tube 114 containing a high hydraulic resistance element 109, the hydraulic system being filled with an incompressible liquid 113. The high resistance element 109 prevents instantaneous fluid flow between the reservoirs 110 and 111 at the exterior of cells 125 and 126 as the liquid 113 expands and contracts in the manner described below. At the same time, element 109 allows the two reservoirs to come to hydrostatic balance by permitting the fluid 113 to flow slowly from one to the other if the gross ambient conditions slowly change. A bellows 106 is also provided in fluid communication with reservoirs 110 and 111 to provide a flexible reservoir for fluid 113 to prevent too large a pressure build-up within the cells upon movement of the diaphragm 124 of the cells. When the temperature of bath 122 rises, the fluid in the bulb 101 becomes heated and expands the fluid 113 in chamber 110 to deflect or flex the compliant diaphragms 124 in such a manner as to cause the electrochemical solutions, which fill the cells to flow from left to right. The reducible ions produce an electrical current at the reducible ion trap 107 in the left cell 125 but no current flows in the right cell 126. The magnitude of the current flowing is a function of the rate of flow of the electrochemical fluid and hence the rate of the temperature change in system 122. A linear D.C. amplifier or relay 116 utilizes this current to indicate that the bath temperature is rising and to produce an output signal that is a function of the rate of rise. The exact functional relation depends upon the design of the electrode 107 as will be brought out more clearly herein below. On the other hand, when the temperature in bath 122 falls, amplifier 115 produces an output signal that is a function of the rate of fall. The electrical output of amplifiers 115 and 116 are applied to the motor control-variable transformer 119 and 120 to thereby drive the variable transformer at a rate dependent upon the magnitude of the signals from 115 or 116.

*Operation*

If the temperature of bath 122 is excessively high, the output of 118 indicates that it is high and applies a signal to the motor control 119 which in turn adjusts the variable transformer 120 to reduce the heat dissipated in coil 121. If, at the same time that the absolute value of the bath is high, the rate of change of the temperature is also great, the electrochemical cell 125 will apply a signal to linear amplifier 116 which will apply an instantaneous correction signal to motor-drive 119 which adds to the signal applied to motor-drive via amplifier 118. For a short interval of time, the temperature of the bath may continue to rise but at a much slower rate. Therefore, the corrective signal applied by amplifier 118 increases but the corrective signal applied by detector cell 125 and amplifier 116 decreases. As the temperature of the bath 122 begins to fall, the output of amplifier 116 is nil but as the temperature rapidly approaches the desired operating temperature, cell 126 indicates via amplifier 115 that the temperature is falling too quickly even though the output of 118 indicates that the temperature is still too high. Therefore, cell 126 applies a correction which is subtractive from the output of amplifier 118. Thus, compensation is made in anticipation of the approach to the operating temperature to eliminate hunting and violent fluctuations in the operation of the control system.

Amplifiers 115 and 116 are linear amplifiers each producing an output in response to its respective increasing or decreasing temperature condition in bath 122. The peculiar functional response to temperature changes in the bath 122 desired in the electrochemical detector circuit need not be incorporated into the electronics of the circuit which would be expensive and would require more complex electronic amplifiers 115 and 116 but the desired response is included directly in the reducible ion collector electrode of the detector cell by proper selection of the geometry of the collector electrode.

Figure 5A:
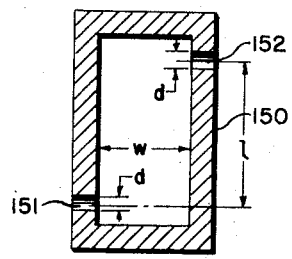
Figs. 5a–5d are enlarged sectional views of various cathode configurations in accordance with the present invention of the electrochemical cell of Figs. 2, 3, and 4, which cathode configurations possess predetermined functional responses to the rate of change in the controlled variable.

Figure 5a shows an electrode from which a square root response to the volumetric flow of the electrochemical solutions in the cells of Figs. 2, 3, and 4 may be derived. Accordingly, the output current I of the cell is proportional to the square root of the rate of change of the controlled variable in these figures. The iodine collector electrode 150 is hollow and generally rectangular in cross section and includes two small orifices 151 and 152 displaced from each other and positioned at opposite sides of the electrode. Both the interior and the exterior surfaces of the electrode are composed of an electrically conducting material and insulating material respectively, the conductive material providing a reaction situs for the reduction reaction. Of course, since it is desirable that the electrode be inert to the corrosive effects of the solution, platinum may be advantageously used to prevent corrosion. In order to assure that the desired response to the volumetric rate of flow of the solution will be obtained, the shape of the electrode 150, the size and position of 151 and 152 must be properly selected. By applying well known principles of mass transfer, it was determined that if the internal dimension $w$ were .010", the diameter $d$ of the apertures were .010" and the distance $l$ were .017", the output current I of the cell would be proportional to the square root of the volumetric rate of flow V of the solution, i.e. $I \alpha V^{.5}$. A reducible ion trap electrode was constructed having these dimensions and was found experimentally to possess the desired functional response to the rate of solution flow. Although an electrode having the dimensions set out hereinabove possesses a square root response, these dimensions are not the only ones which will result in such a response. That is to say, if the dimension $w$ is increased, it will tend to decrease the power of V to a value below .5, on the other hand an increase in $l$ tends to increase the power of V. Therefore, it is apparent that if $l$ or $w$ is altered it is still possible to retain the desired functional response of the cell by judiciously altering the remaining dimension. Furthermore, the dimensions of a cell such as that shown in Fig. 5a may be selected so that the current output will be a function of the volumetric rate of flow raised to powers other than 0.5. The lower and upper limits for a practicable rectangular ion trap electrode are about $I \alpha V^{.4}$ and $I \alpha V^{.8}$ respectively.

Figure 5B:
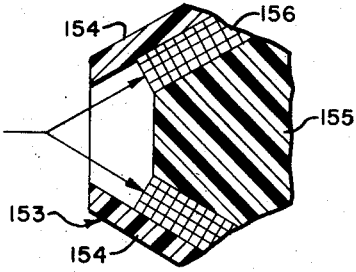

Fig. 5b shows another electrode configuration that may be employed to produce an output current which varies as a linear function of the rate of change of the system being controlled. This electrode 153 comprises an electrically conducting wire gauze 156 tightly packed within the annulus between two electrically insulating frustums 154 and 155. The exterior frustum 154 is hollow at its apex to form a fluid inlet. When the solution flows from left to right as indicated by the arrowed lines in Fig. 5b, the output of a cell utilizing this electrode is linearly responsive to the rate of flow of the solution because virtually all of the reducible ions flowing through the electrode are captured by the gauze and reduced.

Figure 5C:
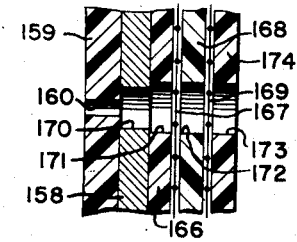

Figure 5c shows a reducible ion collector electrode 157 which, like the electrode 150, develops an output current that is proportional to the square root of the solution rate of flow. This electrode comprises a planar sheet 159 of insulating material having an inlet aperture 160 therein. A conductive coating or sheet 158 of noncorrosive material is deposited upon the downstream side of sheet 159. As is apparent from the drawing, coating 158 has an aperture 170 therein which is concentric with respect to aperture or orifice 160. A second sheet 166 of insulating material is disposed against coating 158 and has an aperture 171 which is slightly larger than aperture 170 and concentric therewith. An electrically conducting screen 167 is sandwiched against one surface of insulating sheet 166 by insulating sheet 168 having aperture 172 coincident with aperture 171. A second wire screen 169 is disposed against the opposite surface of sheet 168 and is held in place by a final non-conducting sheet 174 which contains an aperture 173 concentric with aperture 172. If sheets 159, 158, 166, 168 have a thickness of .062", .005", .003" and .003" respectively, and orifices 160, 170, 171, 172 and 173 have diameters of .012", .030", .032", .032" and .032" respectively the current output varies as the square root of the volumetric rate of flow V providing that screens 167 and 169 are 150 mesh size. However, the exponential power of V may be increased above 0.5 if the mesh is made finer since the probability of more complete capture of all reducible ions is thereby increased.

Figure 5D:
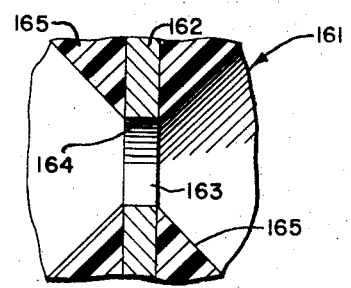

Figure 5d shows an $I_3^-$ ion collector electrode 161 which produces an output current that varies as the logarithm of the rate of change of the variable being controlled. This electrode is a planar sheet of non-corrosive metal 162 approximately .001" thick having an aperture 163 the diameter of which is at least ten times the thickness of the metal sheet 162 so that the length of the orifice through sheet 162 is small compared with the diameter of the orifice 163. The site available for the reduction of the $I_3^-$ or other reducible ion is only at the exposed cylindrical surface 164 of the sheet 162 which is exposed at the aperture 163 since both sides of the sheet are covered with an insulating material 165, as shown, having an orifice coincident with aperture 163. Many other electrode configurations may be designed to give a particular functional response. It should be apparent to one skilled in the art that the electrode shapes described hereinabove merely illustrate the wide variety of practical electrode configurations and are not to be construed as limiting this invention to the electrodes set forth. By applying the techniques and equations utilized in other mass transfer problems, an electrode may be designed having almost any functional response to vary.

Whereas the invention has been described with particularity with reference to an absolute error detection, it is not so limited and, if desired, a well known "go" or "no go" detector may be employed in lieu thereof.

The term absolute error as employed herein may be defined as the magnitude and/or polarity of deviations of a variable controlled factor from a predetermined operating point or range. Furthermore, it will be understood that the mode of electrochemical operation can be altered from the cathodic means of detection described herein to an anodic means by use of adequate redox systems as will be apparent to those skilled in the art.

Although only a few preferred embodiments of this invention have been disclosed in detail, it should be obvious to those reading the above specification that the invention is susceptible of many modifications and alterations without departing from the spirit of its teaching. Therefore the specification and drawings and the embodiments and illustrations set forth therein should not be construed as limiting this invention in any manner and the scope of the invention is to be determined only by the scope of the appended claims.

What is claimed as new and desired to be secured by Letters Patent of the United States is:

1. An automatic control apparatus for detecting deviations from a predetermined value in the characteristic of a variable system to thereby restore the characteristic of said system to said predetermined value comprising means responsive to the instantaneous values of said characteristic to generate a first signal of a magnitude correlative therewith, error correcting means responsively operable to said first signal and operatively associated with the system for restoring the characteristic thereof to said predetermined value under control of said first signal, electrochemical detector means including a redox solution and responsive to the rate of change of the deviations of said characteristic for deriving a signal having a functional relation to said rate of change, and means for applying said derived signal to said error correcting means for supplementing the effect of the first signal to thereby prevent fluctuation of the variable about said predetermined value.

2. In a control system for detecting and correcting the error condition of a variable quantity including means responsive to the absolute error of the variable quantity to generate a corrective signal; a control regulator adapted to regulate the variable quantity in response to the corrective signal, and an electrochemical cell producing a variable current output and connected to said control regulation to modulate the response of said control regulator to said corrective signal, said electrochemical cell comprising a container filled with a redox solution, at least one anode immersed in said solution, at least one cathode immersed in said redox solution and externally connected to said anode, and means responsive to the rate of change of said variable quantity to agitate said redox solution to alter the output current from the cell in a manner dependent upon the rate of change of said variable quantity.

3. In a control system for detecting and correcting the value of a variable quantity to a predetermined operating value which includes means responsive to the instantaneous value of the variable quantity to generate a signal proportional thereto, a regulator operating on the variable quantity to correct the actual value of the quantity in response to said generated signal; the improvement in combination therewith of, an electrochemical cell comprising a closed container, a solution substantially filling said container, said solution comprising $I_3^-$ ions and $I^-$ ions and $I_3^-$ ion collector electrode within said solution, a second electrode in said solution externally connected to said collector electrode to form a complete electrical output circuit, means in the output circuit operating on said regulator to vary the operation of said regulator on the variable quantity in response to the output of said electrochemical cell, and means rendering said cell functionally responsive to the variable quantity to alter the output of said cell in response to the rate of change of the value of the variable quantity.

4. The combination of claim 3 wherein the $I^-$ ion is in large excess.

5. The combination of claim 3 wherein the solution is aqueous.

6. The combination of claim 3 wherein the solution is alcohol.

7. In a control system for detecting and correcting the value of a variable quantity to a predetermined operating value which includes means responsive to the instantaneous value of the variable quantity to generate a signal proportional thereto, a regulator operating on the variable quantity to correct the actual value of the quantity in response to said generated signal; the improvement in combination therewith of an electrochemical detector cell comprising a closed container composed of inert material, a solution substantially filling said container, said solution containing potentially reducible ions and potentially oxidizable ions, a charged reducible-ion collector electrode immersed in said solution, a second electrode charged with a polarity different from said collector electrode and immersed in the solution remote from said ion collector electrode, said electrodes being externally connected to provide an output circuit through which an output current may be passed by said cell, means connecting the output of said cell to said regulator to vary the effect of said regulator on the variable quantity in response to the output of said cell, and means operatively connected to said variable quantity to move potentially reducible ions toward said reducible ion collector electrode of said cell in response to the rate of change of said variable quantity.

8. The combination of claim 7 wherein the potentially oxidizable ions and the potentially reducible ions have like charges.

9. The combination of claim 7 wherein the amount of potentially reducible ions is less than said potentially oxidizable ions.

10. The combination of claim 7 wherein the potentially reducible ion collector electrode is negative with respect to the second electrode.

11. The combination of claim 7 wherein the reducible ion collector electrode is shaped to provide a cell output current that varies in a predetermined functional relation with the rate of change of the variable quantity.

12. The combination of claim 11 wherein the reducible ion collector electrode is shaped to provide a logarithmic relation between rate of change of the variable quantity and the output current of the cell.

13. The combination of claim 11 wherein the reducible ion collector electrode is shaped to provide a linear relation between the rate of change of the variable quantity and the output current of the cell.

14. The combination of claim 11 wherein the reducible ion collector electrode is shaped to provide a square root relation between the rate of change of the variable quantity and the output current of the cell.

15. A rate responsive automatic control device to prevent fluctuations in a variable being controlled comprising a disc having a central aperture and a peripheral flange, a pair of compliant diaphragms secured to the flange at opposite sides of said disc to form a pair of compartments, one on either side of said disc, a redox solution substantially filling the compartments, said redox solution containing potentially oxidizable ions and potentially reducible ions, a reducible ion trap electrode disposed within the aperture in said disc, a pair of electrodes one in each of said compartments, both of said last named electrodes being at a higher potential than said reducible ion trap electrode, and means responsive to changes in the variable being controlled and operatively connected to one of said diaphragms to flex the diaphragm in a manner dependent upon the rate of change in the variable.

16. An automatic control device as set forth in claim 15 wherein said reducible ion trap electrode comprises a hollow conducting element having a first surface with an orifice therein to provide a fluid communication between the solution in one compartment and the interior of the ion trap electrode and a second surface with an orifice communication with the surface in the other compartment displaced from the first named orifice.

17. The rate responsive control device of claim 15 wherein the means responsive to changes in the controlled variable comprises a thin wall bulb, a confined reservoir contiguous to one of said compliant diaphragms, and a tube connecting said reservoir and said bulb relatively non-compressible fluid filling said tube, said bulb and said reservoir whereby the diaphragm is flexed by variations in pressure of said fluid.

18. A rate responsive electrochemical element for use in an automatic control system, to anticipate approach of a controlled variable to a predetermined value comprising; a pair of similar plates each having an interior peripheral flange and an exterior peripheral flange and each plate having a plurality of apertures therethrough, a first compliant diaphragm disposed between said plates and secured to the interior peripheral flanges of the plates, to define a pair of discrete adjacent interior compartments on either side of said diaphragm, a pair of diaphragms one secured to the exterior flange of each plate to form a pair of exterior compartments, a first solution containing oxidizable ions and reducible ions filling each of the exterior compartments, a second solution containing a different concentration of reducible ions than said first solution filling each of the interior compartments, a pair of ion trap electrodes each in a respective aperture of one of said plates and in fluid communication with an exterior compartment and an interior compartment, an electrode disposed within each of the compartments containing the more concentrated solution of the reducible ions, an electrode disposed within each of the compartments containing the less concentrated solution of the reducible ions, means maintaining the electrodes in the more concentrated solutions at a higher potential than the ion trap electrode and maintaining the electrodes in the less concentrated solutions at a lower potential than those in the more concentrated solution, means external of the electrochemical element providing an electrical circuit between each ion trap electrode and the electrodes in the solutions in fluid communication with the respective ion trap electrode, whereby two distinct electrical output circuits are provided from the electrochemical element, means disposed within a second aperture in each of said plates to maintain the difference in concentration of the reducible ions between the solutions in the interior compartments and the solutions in the exterior compartment while allowing oxidizable ions to flow between the respective compartments, and means responsive to the rate and direction of changes in the controlled variable to flex one of the exterior diaphragms so that an output bearing a functional relation to the rate of change of the variable is derived from one circuit when the diaphragm is flexed in one direction and an output having a functional relation to the rate of change of the variable is derived from the other circuit when the diaphragm is flexed in the opposite direction.

19. The electrochemical element of claim 18 wherein the reducible ion is larger in size than the oxidizable ion and wherein the means to maintain the concentration difference of the oxidizable ions between the respective exterior and interior compartments comprises a microporous plug.

20. The electrochemical element of claim 18 wherein the ion trap electrodes are shaped to provide a predetermined functional response to the rate of fluid flow in the direction from a compartment containing solution more concentrated in the reducible ion to the compartment containing solution less concentrated in the reducible ion.

21. The electrochemical element of claim 18, wherein the reducible ion trap comprises an electrically insulating, hollow frustum having an aperture at the apex, said frustum being oriented so that the aperture is contiguous to the fluid compartment containing the solution concentrated in reducible ion, a smaller solid frustum composed of electrically insulating material and concentrically disposed within said hollow frustum to define an annular flow path having an inlet at the apex of said hollow frustum and an annular discharge between the base of said hollow frustum and the base of the said solid frustum, an electrically conducting gauze disposed in the annular flow path, and an external electrical connection to said gauze to connect the gauze to the output circuit associated with the reducible ion trap.

22. The electrochemical element of claim 18 in which the reducible ion trap comprises a conducting sheet having an electrical connection to the output circuit associated with the reducible ion trap, and an electrically insulating coating deposited on both sides of said conducting sheet, said sheet and said coating having an orifice therethrough, so that the only conducting portion of the electrode exposed is the portion of the sheet which forms the wall of the orifice.

23. The electrochemical element of claim 18 in which the reducible ion trap comprises a first electrically non-conducting plate having an orifice therein, a second non-conducting plate having an orifice aligned with the orifice in said first plate and an electrically conducting mesh disposed between said plates and electrically connected to the output circuit of the reducible ion trap electrode.

24. A dual mode follow-up control system for restoring a variable system for a predetermined condition of operation susceptible to deviation therefrom comprising, in combination, means responsive to the instantaneous variations in the condition of operation of said variable system for deriving a corrective factor representative of the deviation of the condition of operation of said variable system from said predetermined condition, electrochemical means including a redox solution for deriving a damping factor in response to the rate of change of the operating condition of said variable system and operatively associated with said first named means to develop a composite factor from their respective derived factors, and coupling means for applying said composite factor to said variable system whereby said variable system is restored to said predetermined condition of operation unattended by overshoot.

References Cited in the file of this patent

UNITED STATES PATENTS

| | | |
|---|---|---|
| 2,282,726 | Jones | May 12, 1942 |
| 2,300,537 | Davis | Nov. 3, 1942 |
| 2,615,940 | Williams | Oct. 28, 1952 |